(12) United States Patent
Kangas et al.

(10) Patent No.: US 7,599,697 B2
(45) Date of Patent: Oct. 6, 2009

(54) METHOD FOR BACKUP CONNECTION AND AN ELECTRONIC DEVICE USING THE METHOD

(75) Inventors: Kalle Kangas, Oulu (FI); Ari-Pekka Peltola, Jääli (FI)

(73) Assignee: Nokia Corporation, Espoo (FI)

( * ) Notice: Subject to any disclaimer, the term of this patent is extended or adjusted under 35 U.S.C. 154(b) by 139 days.

(21) Appl. No.: 10/815,263

(22) Filed: Mar. 31, 2004

(65) Prior Publication Data

US 2005/0221834 A1  Oct. 6, 2005

(51) Int. Cl.
 H04W 4/00 (2009.01)
 H04W 72/00 (2009.01)
 H04B 7/005 (2006.01)
 H04L 27/00 (2006.01)

(52) U.S. Cl. ............. 455/452.1; 455/426.1; 370/278; 370/328; 375/324

(58) Field of Classification Search ......... 455/452.1, 455/557, 426.1, 422.1, 554.1; 370/278, 282, 370/328, 329, 330, 341, 324, 340, 346; 375/324, 375/340, 346
See application file for complete search history.

(56) References Cited

U.S. PATENT DOCUMENTS

| | | | |
|---|---|---|---|
| 6,331,972 B1 * | 12/2001 | Harris et al. | 370/313 |
| 6,343,220 B1 * | 1/2002 | Van Der Salm | 455/552.1 |
| 7,310,338 B1 * | 12/2007 | Foltan et al. | 370/392 |
| 2001/0033554 A1 * | 10/2001 | Ayyagari et al. | 370/328 |
| 2002/0039892 A1 * | 4/2002 | Lindell | 455/151.1 |
| 2002/0097709 A1 * | 7/2002 | Haumont et al. | 370/352 |
| 2002/0151302 A1 * | 10/2002 | Schmidt et al. | 455/426 |
| 2004/0198366 A1 * | 10/2004 | Crocker et al. | 455/452.1 |
| 2004/0203948 A1 * | 10/2004 | Provost et al. | 455/466 |
| 2004/0204076 A1 * | 10/2004 | Kotzin | 455/557 |
| 2004/0224668 A1 * | 11/2004 | Shell et al. | 455/412.1 |
| 2005/0053100 A1 * | 3/2005 | Abousleman et al. | 370/536 |
| 2006/0002338 A1 * | 1/2006 | Guo | 370/328 |
| 2006/0135204 A1 * | 6/2006 | Angelhag | 455/557 |

* cited by examiner

Primary Examiner—Nay A Maung
Assistant Examiner—Andrew Wendell
(74) Attorney, Agent, or Firm—Harrington & Smith, PC

(57) ABSTRACT

The invention relates to a method for establishing an at least partially wireless data transfer connection between a remote application and a controlling application. The wireless connection is implemented by a wireless terminal connected to the remote application. The wireless terminal can select from a group of allowable connection parameter settings a usable connection parameter setting for the wireless link, if a default connection parameter setting for the wireless link is not usable. The invention relates also to a wireless terminal using the method and a computer program implementing the method in the wireless terminal.

14 Claims, 4 Drawing Sheets

METHOD FOR BACKUP CONNECTION AND AN ELECTRONIC DEVICE USING THE METHOD

FIELD OF THE INVENTION

The invention relates to a method for using a backup in a telecommunication connection where a wireless data transfer connection between a remote application and a controlling application should be established, and where the wireless link from the remote application is implemented by a wireless terminal connected to the remote application.

BACKGROUND OF THE INVENTION

Series of fundamental changes have happened in communication culture and technologies. Some twenty years ago mobile devises were introduced to customers for voice communication. Subsequently customers learned also to satisfy their other communication needs using data services on their mobile devices. Also a possibility to use the Internet by mobile devices was introduced.

The next quite obvious step was to extend mobile connectivity beyond human beings. So individuals can nowadays communicate with wireless devices with other individuals, devices or systems. The next step forward was a solution where two or more machines or applications connected thereto are communicating with each other without a human touch by at least partly wireless methods. Those solutions are often called machine-to-machine solutions or shortly by an abbreviation M2M.

Machine-to-machine applications combine features of both the information and telecommunication technology. Some examples of possible applications are: Telemetry: utility meter reading, parking meters; Public traffic services: traffic information, electronic tolling; Sales & payment: vending machines, photocopiers; Service & maintenance: elevators, industrial machines; and solutions in areas of: telematics in vehicles, security and surveillance, telemedicine, fleet management and home applications.

As mentioned above M2M systems can be quite complicated. FIG. 1 illustrates an example of a system according to the prior art. There is a remote application 15 to or from which all communication must be done trough a wireless terminal 14. In the example of FIG. 1 the terminal 14 is a GSM terminal (Global System for Communications). The GSM terminal 14 resides in a cell which belongs to a GSM network 10. The GSM network 10 is connected to some INTRANET 12, which can be for example a corporate data network, through a gateway 11. Gateway 11 can comprise also a Gateway Access Software. INTRANET 12 includes also a controlling application 13, which is used as a control means for the remote application 15 i.e. the control application is a host to the remote application. This controlling application 13 includes also all connection parameter settings 131 (CPS 1, CPS 2, and CPS n), which the controlling application 13 can utilize in its communication. Which one of the two mentioned applications starts a communication connection depends on a particular situation.

Also the GSM terminal 14 includes its own connection parameter settings 141 (CPS 1, CPS 2 and CPS m). There can be some differences between the connection parameter settings in the GSM terminal 14 and the controlling application 13 located in INTRANET 12.

Next will be illustrated an example how this prior art system functions in an exemplary situation where the controlling application 13 retrieves information from the remote application 15 by exploitation of one of the possible connection parameter settings 131. For sending a command to the remote application 13 the controlling application 13 establishes at first a data transfer connection 111 to the gateway 11. From there the command is routed via a further data connection 101 to the GSM network 10. The command is further routed by a service bearer on a radio channel 103 to the wireless GSM terminal 14. If possible, a default service bearer defined in the CPS settings is used in the data transfer in the radio channel 103 between the core GSM network 10 and GSM terminal 14. Some examples of the possible service bearers are: GPRS (General Packet Radio Service), EGPRS (Edge GPRS), HSCSD (High Speed Circuit Switched Data), CSD (Circuit Switched Data) and SMS (Short message Service).

From the GSM terminal 14 the command is sent for example via a fixed connection 151 or via a proximity connection utilizing Bluetooth or other proximity network technology to the remote application 15. The remote application 15 follows the command it has received. A result of the command can be that the remote application 15 sends some data back to the controlling application 13. This is depicted by an arrow 152. The route back to the controlling application 13 can be the route depicted above in a reversed order. The process ends when the controlling application 13 receives the data sent by the remote application 15.

It is also possible that the remote application 15 is an initiator in a connection setup attempt. In that case the connection setup will be made using a default bearer, which is defined to the remote application 15.

The default connection parameter setting, or in other words the default service bearer, which the GSM terminal 14 uses, can be defined by a command 153 given by the remote application 15 or controlling application 13. In both cases the decision to be made must be done either in the controlling application 13 or remote application 15 but not in the wireless terminal 14, which only follows those orders it has received. This kind of function is possible if in the design phase the application designer has also the capability to implement to the remote application special features, which are connected to the possible service bearers.

So in the prior art the wireless GSM terminal 14 is not allowed to change the bearer service independently. A problem can arise when the default bearer service is not usable for some reason. In that situation the wireless GSM terminal 14 makes useless connection setup attempts which can all fail in the worst case. If the application designer has no taken this situation into account, the data transfer cannot succeed at all. Often the application designer is not capable or willing to design also the communication features needed and that is why the remote application 15 works perfectly only in limited environmental conditions.

SUMMARY OF THE INVENTION

An object of the invention is to provide a new kind of wireless communication establishment procedure to a remote application where the remote application needs not to know which kind of a service bearer is to be used in the supporting wireless link.

The objects of the invention are achieved by connection establishment method where the selection of an appropriate service bearer is done fully in a wireless terminal connected to the remote application. The terminal has a list of preferred service bearers and it makes the decision about which one of them is the most appropriate and also available. In this decision the terminal avails knowledge about data which the remote application wants to transmit, available service bearers and their expenses.

An advantage of the invention is that the remote application can be designed simpler because there is no need to implement parts or software elements which are needed in data transfer in a supporting wireless link.

Another advantage of the invention is that if changes to connection parameter settings are needed, these can be made directly to the terminal configuration either by controlling application or remote application.

Another advantage of the invention is that the data transfer is more reliable than by using a system of prior art because the terminal can use anyone of the existing service bearers in the cellular network if needed.

A further advantage of the invention is that it enables usage of several operators.

A further advantage of the invention is that the order of the service bearers or the default service bearer can be changed according to terminal configuration which means that the remote or controlling application do not need to manage bearer selection.

Yet another advantage of the invention is that the default service bearer will be resumed when conditions put by the user of the application are fulfilled.

The idea of the invention is basically as follows: A wireless terminal, which is connected to a remote application, includes a list of service bearers in a preferred order. It comprises for example all usable service bearers and their connection parameter settings. That is why there is no need in the remote application, which is connected to the GSM terminal according to the invention, to be included connection parameter settings, which are needed if a service bearer used in the wireless link between the GSM terminal and core GSM network must be changed for one reason or another. The GSM terminal uses the connection parameter settings in the list in a defined order. If the first one in the list cannot be used, the GSM terminal moves to next one on its list. If the second one is not possible either, the GSM terminal moves to the next one in order and so on. This procedure recurs every time when there is a need to establish a data transmission connection from or to the remote application. If for some reason the default service bearer was not used in a data transmission, which already has been disconnected, a returning mechanism included in the invention changes back to the original service bearer. The wireless terminal according to the invention can also comprise a list of allowed service operators.

Some preferred embodiments of the present invention are disclosed in the depended claims.

BRIEF DESCRIPTION OF THE DRAWINGS

The invention is described in detail below. Reference is made to the accompanying drawings in which.

DETAILED DESCRIPTION

Figure 1:
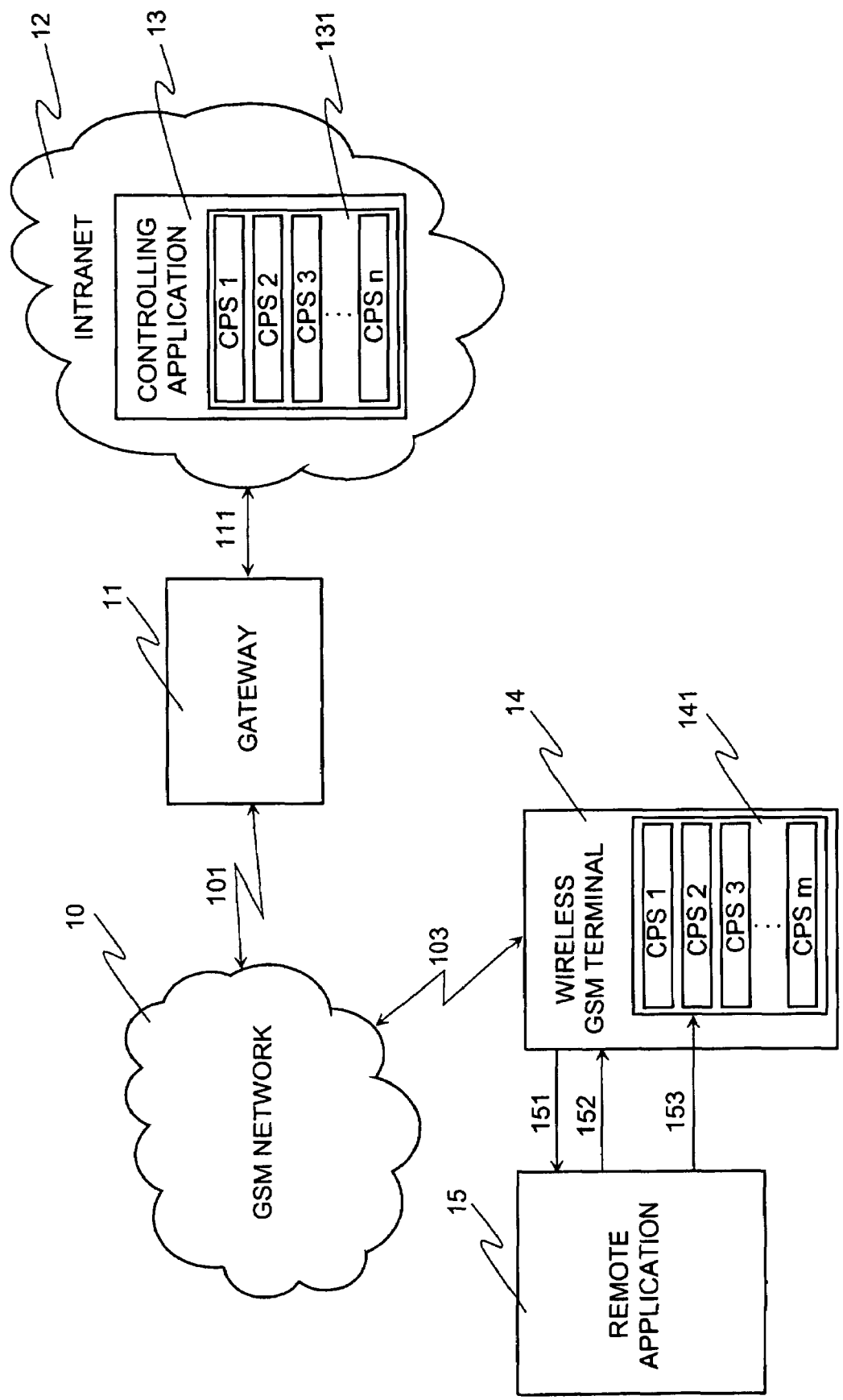
FIG. 1 shows an example of a telecommunication network of a prior art.

FIG. 1 was discussed in conjunction with the description of the prior art.

Figure 2A:
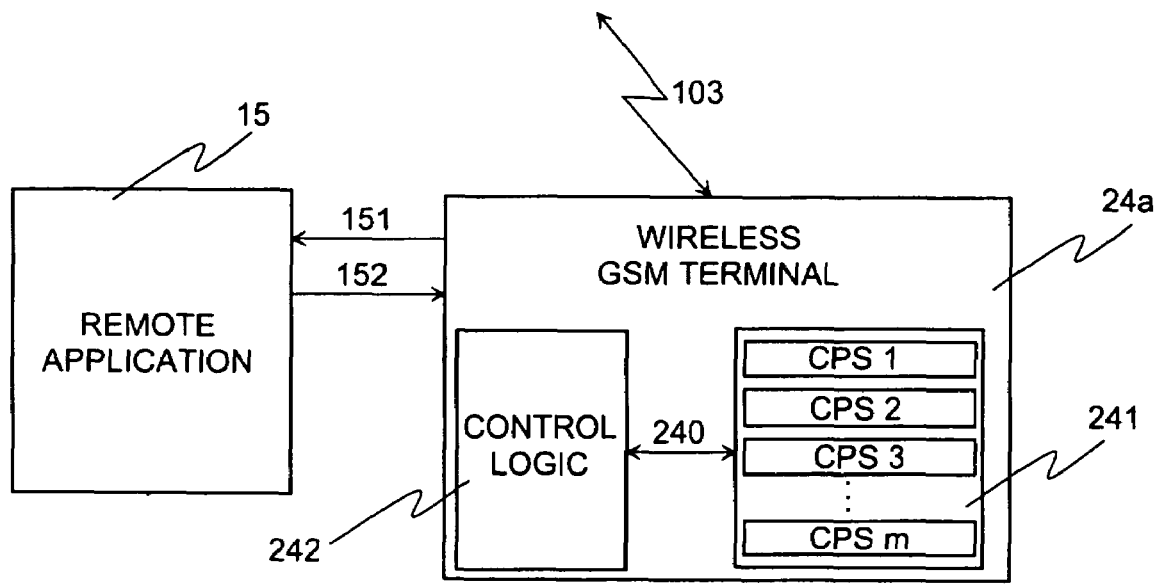
FIG. 2a shows an embodiment of a wireless terminal according to the invention.

FIG. 2a illustrates an example of the present invention. A remote application 15 is fixedly or proximity connected to a wireless terminal 24a according to a first embodiment of the invention. With an arrow 151 is depicted information or commands, which the wireless terminal 24a has received from a controlling application 13 located in some INTRANET (shown in FIG. 1) and which will be inputted to the remote application 15. With a second arrow 152 is depicted data that will be transmitted from the remote application 15 to the controlling application 13. In this example data is transmitted via a wireless link 103 to a serving GSM network and from there to the INTRANET 12.

Figure 2B:
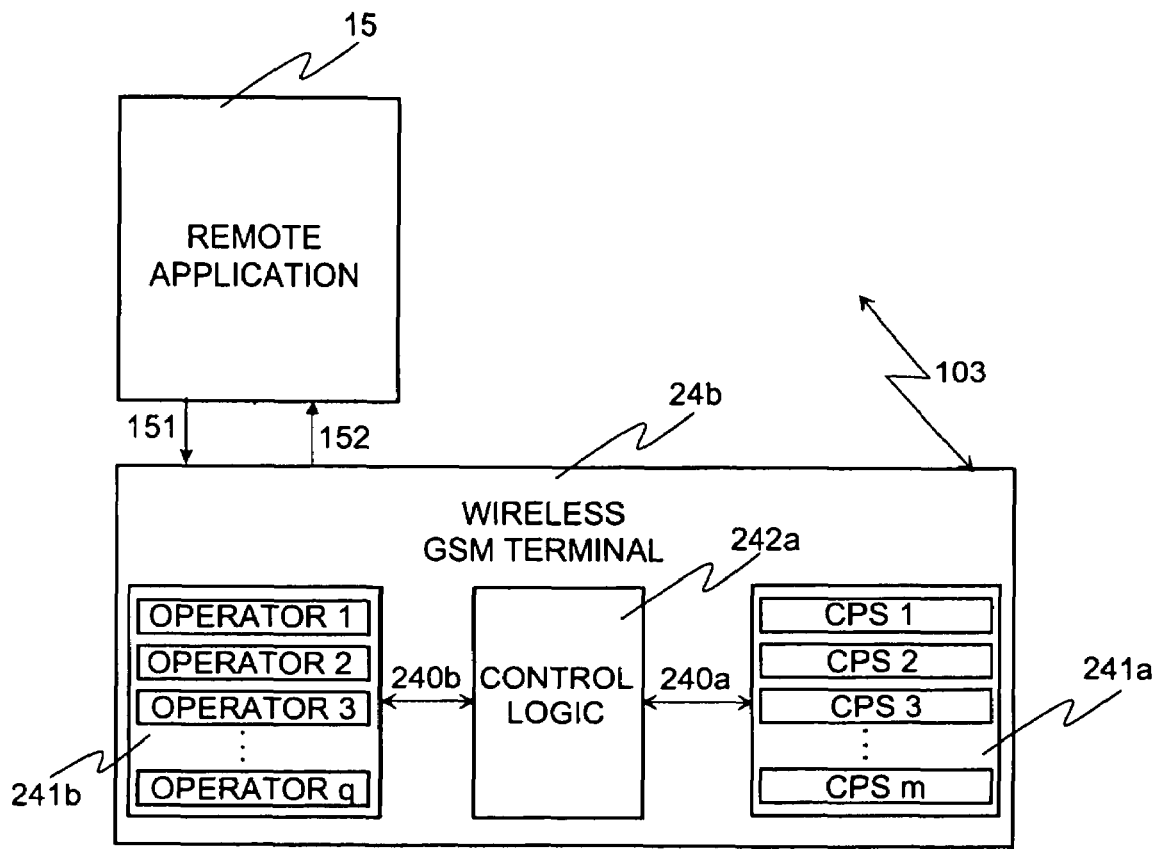
FIG. 2b shows a second embodiment of a wireless terminal according to the invention.

The remote application 15 has only those features which are necessary for its basic purpose or function. It is not needed to implement parts or functions, which are needed in data transmission in a serving telecommunication network. The serving network in the examples of FIGS. 1, 2a and 2b is a TDMA-network (Time Division Multiple Access) for example a basic GSM network or a GSM network supporting also a GPRS service. However, the inventive idea can be implemented also in other cellular networks technologies.

A wireless terminal 24a according to the first embodiment of the invention comprises control logic 242 and a functional block 241 for connection parameter settings: CPS 1, CPS 2 and CPS m. Each one of the parameter settings corresponds to one given service bearer for example: GPRS, EGPRS, HSCSD, CSD and SMS. The preferred order of use of these connection parameter settings is predetermined. One of them is always a default connection parameter setting. The control logic 242 tries to use the default connection parameter setting when a new connection must be established. If this is not possible for some reason at all or if it does not succeed, the control logic 242 tries the next appropriate connection parameter setting. If also this second connection parameter setting is impossible to use, the control logic 242 chooses the third preferred connection parameter setting if there are more than two configured. This process can continue until the last possible connection parameter setting has been tried and it has also failed. If this unwanted circumstance has arisen, some alternative courses of action are depicted in connection of FIG. 3. The order in which the control logic 242 makes the establishment tryouts is advantageously defined during the application installation. However, according to the invention it is possible to change the originally defined order with an order given by the controlling application 13 located in the INTRANET 12.

The control logic 242 has a fixed connection 240 to the functional block 241. Through this connection the control logic 242 can utilize the connection parameter settings and arrange and change the order of the available connection parameter settings. So if the controlling application 13 gives an order to the wireless terminal 24a to change the preferred order of the connection parameter settings 241, the control logic 242 makes the ordered changes without any additional commands from the remote application 15.

FIG. 2b illustrates a second embodiment of the present invention. A wireless terminal 24b comprises control logic 242a, first functional block 241a for connection parameter settings: CPS 1, CPS 2, CPS 3 and CPS m and second functional block 241b for operator selection: operator 1, operator 2, operator 3 and operator q. The control logic 242a has a fixed connection 240a to the first functional block 241a. Through this connection the control logic 242a can utilize the connection parameter settings and arrange and change the order of the connection parameter settings in the first functional block 241b. The control logic 242a has also a fixed connection 240b to the second functional block 241b where the preferred operator settings are. Through this connection 240b the control logic 242a can utilize the preferred operator settings and arrange and change the order of the preferred service operators.

There are several possibilities how control logic 242a can function in the example of FIG. 2b. The first option is to choose first one of the service operators 241b, which are also arranged into preferred order. The first one of them is set as default operator. If the default operator is not available, the control logic 242a selects an operator preferred next. When the service operator has been selected and there is need for communication, the control logic 242a subsequently selects the default connection parameter setting from connection parameter settings 241a, i.e. a preferred service bearer. If it is not available, the next suitable connection parameter setting will be tried. If none of the possible connection parameter settings are available or cannot be used for some reason, the connection establishment is failed.

A second possible option is that the connection parameter setting, i.e. the service bearer, is selected first. After that the control logic 242a combs the operator list 241b. If the default operator can support the wanted service bearer, it will be used. However, if the default operator is incapable to offer wanted service bearer, the control logic 240a moves to the next preferred service operator. This process continues until a service operator, which can offer the wanted service, is found. If none of the possible service operators can support the asked service bearer, the connection establishment is failed.

A third possible option is to use the connection parameter settings 241a and service operator list 241b in an arbitrary combination. In this option for example the default connection parameter setting, i.e. service bearer, can be selected first. After that the default operator is selected from the operator list. If it can support the selected service bearer, this operator will be the serving one. However, if the default operator cannot support the wanted service bearer, the next appropriate operator will be tried. This process continues until a service operator, which can offer the asked service, is found. If none of the possible service operators can support the asked service bearer, the control logic 242b returns to the connection parameter settings 241b. It selects the next appropriate connection parameter setting and returns again to the service operator list 241b. The order, in which the operator list is now used, can be the same as in the first pass of the operator list or the order can also be changed.

In this third option either one of the possible selections can be done first: a selection from the connection parameter settings 241a or a selection from the operator list 241b. It is also possible that the order of the items in either one of the lists can depend on the preceding selection of the other list. Connection establishment tryout is failed only when the last possible selection has been failed.

Which one of the above-mentioned alternatives is used can be based for example on the reliability of the service bearer, costs involved, capacity needed or time on hand.

Figure 3:
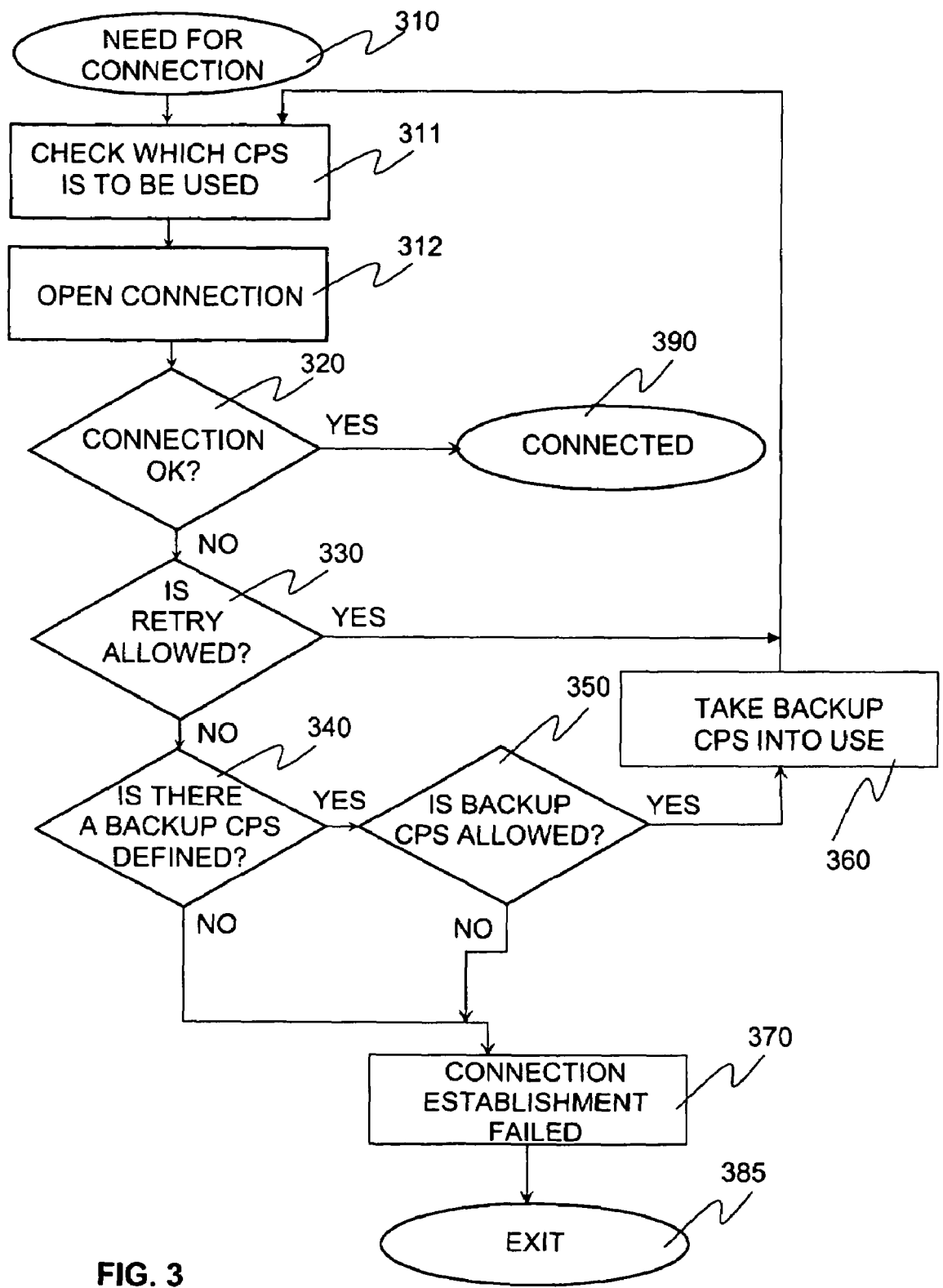
FIG. 3 shows, as an example, a flow chart including main stages of the method according to the invention.

FIG. 3 illustrates in the form of an exemplary flow chart the main stages of the connection backup method of the present invention. In the beginning a wireless terminal 14 is in a standby mode or idle state. The connection establishment procedure starts in phase 310 where a need for connection is detected. In the next step, reference sign 311, is checked which connection parameter settings, which correspond to available service bearers, have been implemented in the wireless modem. It is also checked which one of them at present is the default one.

The connecting setup starts with the default connection parameter setting, phase 312. Next in a first comparison phase 320 is checked if the attempt made in phase 312 was successful or not. If it was successful, the process ends in phase 390 where the actual data transfer between the remote application 15 and the controlling application 13 in the INTRANET 12 takes place.

It is also possible that in the beginning of the above-mentioned connection attempt in phase 312 the serving network sends immediately a message, for example an error code, which ends immediately the attempt underway. In this situation the process goes directly to phase 370 where an indication is given that the connection attempt has been failed (not shown in FIG. 3). After that the process moves to exit phase 385 and the process ends without any successful connection.

After disconnection of the data transmission in phase 390 a default connection parameter setting will always be defined for the next connection establishment attempt. There are several alternatives: First the original default parameter setting can be restored if it has been changed. Second alternative is that the used connection parameter setting can be set as a new default one. A third alternative is that after a predetermined time the original connection parameter setting is restored. Until that, the last used connection parameter setting is used as a default one. Which of the above-mentioned options will be used depends on the configuration of the M2M terminal/module.

If the first comparison in phase 320 gives a negative result, the process proceeds to a second comparison phase 330. There it is checked, whether a new connection setup attempt with the same connection parameter setting is allowed or not. One of the decision criteria used in this phase 330 is the number of allowed tryouts for a certain connection parameter setting. If a new tryout is allowed, the process returns to phase 311 and the above described sequence recurs. In that case a new connection attempt starts again in phase 311 with the same connection parameter setting as earlier.

If the comparison in second comparison phase 330 gives a negative result, which means that the default connection parameter setting cannot be used anymore, the process continues in a third comparison phase 340. In the third comparison it is checked if there is a backup connection parameter setting according to the invention left. If the third comparison gives a negative answer it means that the intended connection cannot be established and the process proceeds via phase 370 to exit phase 385.

If the comparison in third comparison phase 340 gives a positive result, the process continues to a fourth comparison phase 350. In fourth comparison phase 350 it is checked if the backup connection parameter setting can be used or not. Which one of the possible backup connection parameter settings is used in this phase can be defined for example by a counter, which is incremented every time when a transition from third comparison phase 340 to fourth comparison phase 350 occurs.

If the comparison in fourth comparison phase 350 gives a positive result the process continues to phase 360. In phase 360 the alternative backup connection parameter setting replaces the earlier one, which did not succeed to open wanted communication channel. After phase 360 a new attempt starts in phase 311 and the process continues in above described manner.

If the comparison in fourth comparison phase 350 gives a negative result, which means that the alternative backup connection parameter setting cannot be used for some reason, the process branches via phase 370 to the exit phase 385.

In the exit phase 385 it is noticed that the connection establishment has been failed definitively. In that case the process ends in phase 385 without any successful data transfer, which then typically results in a notification to the remote application 15.

For example following reasons can result in the exit phase 385. If the remote application 15 is embedded in a moving unit, for example in a container, the unit can end up in an area where no service operator, which the wireless terminal is aware of, provides a service. It is also possible that a moving unit ends up in place where it is surrounded by conducting materials as the case may be in a bay of a ship. A telecommunication connection is not possible in either case.

The unwanted exit phase 385 can cause that a new connection establishment attempt is made after some predetermined time. This unwanted situation, i.e. no connection established after several connection attempts, can recur for a number of times. In this situation it is possible that the remote application 15 sets a time limit to the wireless terminal 24a or 24b when a new attempt will be allowed. This time limit can also be configured to the wireless terminal as a default during the implementation of the terminal.

It is also possible that, if the connection establishment attempts do not end with a successful connection, the wireless terminal is allowed to reset its functions. The wireless terminal can do it at once or after a predetermined time. It is also possible that the remote application 15 gives a reset order. After the reset of the wireless terminal 24a, 24b a new connection establishment attempt can be made. If the connection attempt is not successful, a new reset is possible. However, advantageously the time after which a new reset is allowed is always longer than the time lapsed between last two preceding reset attempts.

Above mentioned phases can be fulfilled by appropriate software means, i.e. a computer program, which is installed in the wireless terminal 24a, 24b. The computer program can be implemented for example by Java language.

Figure 4:
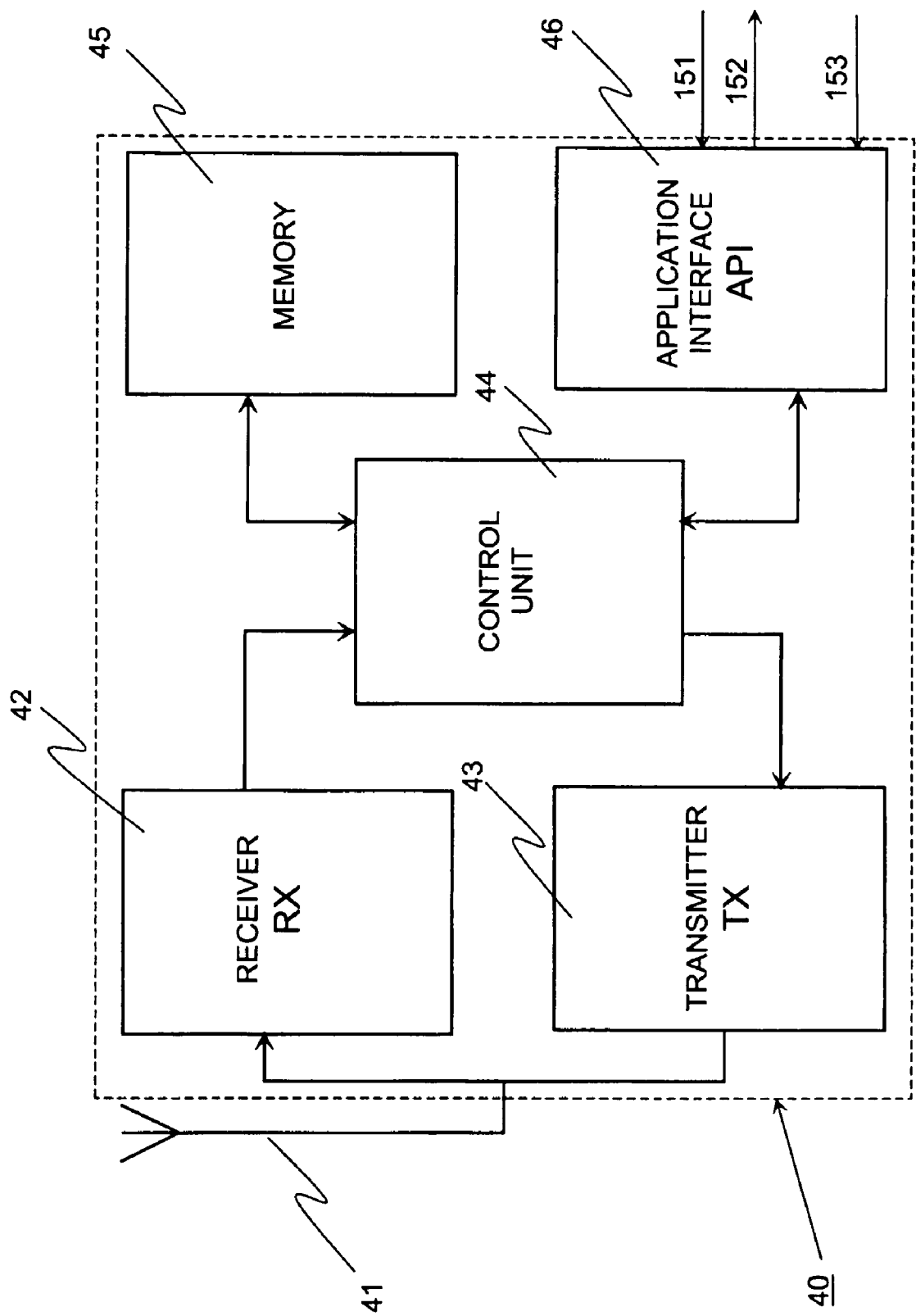
FIG. 4 shows, as an example, the main components of a wireless terminal where the method according to the invention is used.

FIG. 4 shows, as an example, main parts of a wireless terminal 40 employing the method according to the invention. The terminal 40 utilizes an antenna 41 in transmitting and receiving messages. Reference designator 42 represents the means constituting a receiver RX by which the wireless terminal 40 receives messages from the supporting cellular network. The receiver RX comprises the means according to the prior art for all received messages.

Reference designator 43 represents the means that constitute a transmitter TX in the wireless terminal 40. The transmitter 43 performs on the signal to be transmitted all the necessary signal processing measures required when communicating with the supporting cellular network.

From the point of view of the invention the crucial functional unit in the terminal 40 is the control unit 44, which controls the operation of the wireless terminal. The control logic 242 or 242a, as depicted in FIG. 2a or 2b, can be part of the control unit 44 of the terminal 40. In this arrangement according to the invention the control unit 44 determines after each connection establishment request which one of the possible connection parameter settings, i.e. the service bearers, will be used. The control unit 44 uses in the deduction process a computer program according to the invention, which carries out the steps depicted in FIG. 3. The computer program required by the control unit 44 in the operation according to the invention advantageously resides in a memory unit 45.

Also the connection parameter settings 241 or 241a and operator list 241b can be saved in the memory 45 of the terminal 40.

The control unit 44 is further used to control an application interface API 46 of the terminal 40. The remote application 15 can be connected, reference signs 151, 152 and 153, to the application interface 46. Data can be transferred to or from the remote application 15 by fixed connections 151 and 152. A third connection 153 illustrates a possibility to give commands to the wireless terminal 40, for example a reset command.

Some advantageous embodiments according to the invention were described above. The invention is not limited to the embodiments described. The inventional idea can be applied in numerous ways within the scope defined by the claims attached hereto.

The invention claimed is:

1. A method for establishing a wireless data transfer connection between a remote application and a controlling application, where the wireless link from the remote application is implemented by a wireless terminal connected to the remote application, the method comprising:
    arranging a group of allowable connection parameter settings in a pre-determined order, each connection parameter setting corresponding to a different service bearer;
    attempting to use a default connection parameter setting, wherein the default connection parameter setting corresponds to a default service bearer;
    detecting that the default service bearer is not usable to establish a wireless data transfer connection;
    serially selecting another connection parameter setting for the wireless link from the group of allowable connection parameter settings in the pre-determined order one-after-another until a usable service bearer is identified to perform the wireless data transfer; and
    after identification of the usable service bearer and a successful wireless data transfer, setting the default connection parameter setting to the usable service bearer.

2. The method according to claim 1, where the original connection parameter setting is restored when a predetermined time, defined by the controlling or remote application, has lapsed after the successful data transfer connection.

3. The method according to claim 1, wherein establishing a data transfer connection between the remote application and the controlling application comprises
    detecting a need for a data transfer across a wireless link; and
    wherein attempting to use a default connection parameter setting further comprises:
    attempting to establish a data transfer connection with a default connection parameter;
    determining if a data transfer connection has been established using the default connection parameter;
    if no data transfer connection has been established, trying a second time to establish a data transfer connection with the default connection parameter setting; and
    using the usable connection parameter setting to establish the data transfer connection.

4. The method according to claim 3 further comprising noticing that the connection establishment is not possible because there is no backup connection parameter settings defined.

5. A wireless terminal configured to be connected to a remote application, the wireless terminal comprising transmitting and receiving means, a memory, an application interface and a control unit, where the control unit further comprises a control logic, the control logic configured to attempt to use a default connection parameter setting, wherein the default connection parameter setting corresponds to a particular service bearer; to detect that the default connection parameter setting for the wireless link is not usable; and to serially select another connection parameter setting for the wireless link from a group of allowable connection parameter settings, wherein each of the allowable connection parameter settings corresponds to a different service bearer, the group of allowable connection parameter settings being ordered in a pre-determined order, and wherein the connection parameter settings are serially selected, one-after-another, in the pre-determined order, until a usable service bearer is identified to perform the wireless data transfer; and after identification of the usable service bearer and a successful wireless data transfer, to set the default connection parameter setting to the usable service bearer.

6. The wireless terminal according to claim 5 which is arranged to restore the original connection parameter setting when a predetermined time, defined by the controlling or remote application, has lapsed after the successful data transfer connection.

7. The wireless terminal according to claim 5 where the wireless terminal is a GSM terminal.

8. The wireless terminal according to claim 7 where the group of allowable backup connection parameter settings allowed for GSM terminal corresponds to at least two of the following service bearers: GPRS, EGPRS, HSCSD, CSD and SMS.

9. The wireless terminal according to claim 5 which further comprises a list of allowable service operators in a preferred order.

10. A memory embodying a computer program configured to perform operations that control a connection setup of a wireless terminal when executed by control logic of the wireless terminal, the operations comprising:
  detecting a need for a data transfer across a wireless link;
  checking a default connection parameter setting, wherein the default connection parameter setting corresponds to a particular service bearer;
  attempting to establish a connection with the default connection parameter setting;
  determining if the data transfer connection has been established using the default connection parameter setting;
  if no data transfer connection has been established, trying a second time to establish a data transfer connection with the default connection parameter setting;
  if no data transfer connection is established after the second try, serially selecting another connection parameter setting for the wireless link from a group of allowable connection parameter settings, wherein the group of allowable connection parameter settings is ordered in a pre-determined order, each of the connection parameter settings in the group of allowable connection parameter settings corresponding to a different service bearer, and wherein the connection parameter settings are serially selected, one-after-another in the pre-determined order, until a usable service bearer is found;
  establishing a data transfer connection with the usable service bearer; and
  after identification of a usable service bearer and a successful wireless data transfer, setting the default connection parameter setting to the usable service bearer.

11. The memory according to claim 10 the operations further comprising noticing that the connection establishment is not possible because there are no backup connection parameter settings defined.

12. A method for establishing a wireless data transfer connection between a remote application and a controlling application, where the wireless link from the remote application is implemented by a wireless terminal connected to the remote application, the method comprising:
  detecting that a default connection parameter setting for the wireless link is not usable, wherein the default connection parameter setting corresponds to a particular service bearer;
  determining if a command has been received from a controlling application changing a default order for selection of connection parameter settings to a new order and, if so, selecting a connection parameter setting in the new order established by the controlling application, wherein each of the connection parameter settings in the default and new orders corresponds to a different service bearer; and
  if no command has been received from the controlling application, selecting the connection parameter setting for the wireless link from a group of allowable connection parameter settings in the default order;
  serially selecting another connection parameter setting for the wireless link from the group of allowable connection parameter settings in the default order one-after-another until a usable connection parameter setting is identified, wherein the usable connection parameter setting corresponds to a particular service bearer; and
  after identification of a usable service bearer and a successful wireless data transfer, setting the default connection parameter setting to the usable service bearer.

13. A method for establishing a wireless data transfer connection between a remote application and a controlling application, where the wireless link from the remote application is implemented by a wireless terminal connected to the remote application, the method comprising:
  arranging a group of allowable service operators in a pre-determined order, wherein a service operator ordered first comprises a default service operator;
  arranging a group of allowable connection parameter settings in a pre-determined order, wherein each of the connection parameter settings corresponds to a different service bearer, and wherein a connection parameter setting ordered first comprises a default connection parameter setting;
  attempting to use the default service operator;
  if the default service operator is not usable, serially selecting another service operator from the group of allowable service operators in the pre-determined order one-after-another until a usable service operator is found;
  detecting a need for a data transfer over a wireless link;
  attempting to use the default connection parameter setting;
  detecting that the default connection parameter setting is not usable;
  serially selecting another connection parameter setting for the wireless link from the group of allowable connection parameter settings in the pre-determined order one-after-another until a usable connection parameter setting is identified, wherein the usable connection parameter setting corresponds to a particular service bearer; and
  after identification of a usable service bearer and a successful wireless data transfer, setting the default connection parameter setting to the usable service bearer.

14. A wireless terminal connected to a remote application, the wireless terminal comprising transmitting and receiving means, a memory, an application interface and a control unit, where the control unit further comprises a control logic, the control logic configured to attempt to use a default connection parameter setting, the default connection parameter setting corresponding to a particular service bearer; to detect that the default connection parameter setting is not usable; to select a connection parameter setting for the wireless link from a group of allowable connection parameter settings, wherein each of the allowable connection parameter settings comprising the group corresponds to a different service bearer; after identification of a usable service bearer and a successful wireless data transfer to set the default connection parameter setting to the usable service bearer; and serially to select a service operator from a list of allowable service operators, wherein the list is in a pre-determined order, and wherein the service operators are selected one-after-another in the pre-determined order.

* * * * *